United States Patent Office 2,774,784
Patented Dec. 18, 1956

2,774,784

HALOALKANOYL RESIN ACID DERIVATIVES

George M. Picha, Skokie, Ill., assignor, by mesne assignments, to G. D. Searle & Co., Skokie, Ill., a corporation of Delaware No Drawing. Application August 30, 1954,
Serial No. 453,147

15 Claims. (Cl. 260—469)

The present invention is concerned with derivatives of resin acids with partially saturated phenanthrene nuclei and, more particularly, with those containing a halogenated alkanoyl side chain. This application is a continuation-in-part of my copending application Serial No. 393,958, filed November 23, 1953, and of the application copending therewith, Serial No. 257,977, filed November 23, 1951, now abandoned.

The resin acids and their lower alkyl esters which are suitable for the objects of this invention are those belonging to the phenanthrene series, which includes the various pimaric acids, dehydroabietic acid, neoabietic acid, and podocarpic acid, but excludes such compounds as agathic acid. The phenanthroid resin acids all have a common nuclear skeleton, except only for a difference in unsaturation and in substitution in the 6- and 7- positions. The common features reveal a 1,12-dimethyl-polyhydrophenanthrene-1-carboxylic acid of the type

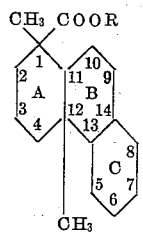

My invention consists in the introduction into ring C of a group

—CO—CHX—R' wherein X is halogen and R' is hydrogen or a lower alkyl radical. When R' is hydrogen the substituent is a halogenated acetyl group. When R' is methyl, ethyl, straight- or branched-chain propyl, butyl, amyl or hexyl, the alkanoyl group is always substituted by a halogen atom in the position α to the carbonyl group.

The resin acid derivatives which are preferred as starting materials for the preparation of the compounds of my invention are those which have an aromatic ring as one of their structural features. Included in this category are dehydroabietic acid and its lower alkyl esters and podocarpic acid and its lower alkyl esters and lower alkyl ethers. The introduction of the halogenated alkanoyl side chain as a substituent on the aromatic ring of these compounds can be accomplished by a number of methods.

One of the convenient starting materials is the methyl O-methyl-7-acetylpodocarpate of Campbell and Todd, described in J. Am. Chem. Soc., vol. 62, p. 1292 (1940) which has the structural formula

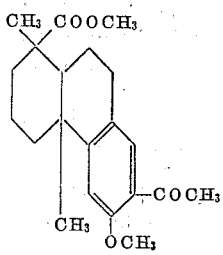

The acetyl radical of this ester can be brominated to form the 7-bromoacetyl derivative. By analagous procedures the 7-bromoacetyl derivatives can be prepared from podocarpic acid, O-methyl podocarpic acid, and methyl podocarpate.

Methyl O-methyl-7-acetylpodocarpate can also be used as a starting material in an alternative procedure. Subjected to the haloform reaction, it forms the 1-methyl ester of the 7-carboxy derivative, i. e. the 1,12-dimethyl-6-methoxy-1,2,3,4,9,10,11,12-octahydrophenanthrene-1,7-dicarboxylic acid. The 7-carboxy group, on treatment with a halogenating agent such as thionyl chloride, yields the carbonyl chloride which is made to react with diazomethane to form the diazoketone. The latter, on treatment with hydrogen bromide forms the bromoacetyl compound.

By employing derivatives of dehydroabietic acid as starting materials, it is possible to introduce a halogenated alkanoyl radical at positions in a resin acid nucleus other than the 7-position. Acetylation of the methyl ester of dehydroabietic acid yields a mixture of acetyl derivatives (cf. Fieser and Campbell, J. Am. Chem. Soc., vol. 60, p. 2635 (1938)). The 6-position, being most reactive, is attacked most vigorously. The remaining acetyl derivatives consist primarily of the 8-acetyl compound with only a small quantity of the 5-acetyl compound being formed. When each of these, or the isomeric mixture, is brominated, the bromoacetyl derivatives result.

By condensing methyl O-methylpodocarpate or methyl dehydroabietate with a haloacetyl halide such as chloroacetyl chloride in the presence of aluminum chloride, a haloacetyl compound results directly. This is a convenient method for preparing the chloroacetyl derivatives. The iodoacetyl derivatives are prepared by treating the corresponding chloroacetyl derivatives with sodium iodide.

The compounds of my invention which have a more complex halogenated alkanoyl group substituted on the aromatic ring are prepared by suitable modifications of these procedures as disclosed more fully in the examples to follow.

The compounds which constitute this invention are valuable therapeutically and, in particular, exhibit hormonal activity, being effective as thymolytic agents. The compounds described herein which have free carboxyl groups are choleretic agents.

A particular utility of the halogenated alkanoyl compounds which constitute this invention is that they are intermediates useful in the preparation of the corresponding acyloxyalkanoyl resin acid derivatives which are an important class of potent hormonal and hypotensive agents.

My invention will appear more fully from the following examples. It will be understood, however, that these examples are set forth by way of illustration only and that the invention is not to be construed as limited in spirit or in scope by the details contained therein. It will be apparent to those skilled in the art that many modifications in materials and methods can be made without departing from the scope of the invention. In each of these examples temperatures are given in degrees centigrade and quantities of materials in parts by weight.

*Example 1*

A solution of 100 parts of the methyl ester of dehydroabietic acid and 27 parts of acetyl chloride in 1000 parts of nitrobenzene is stirred at 0° C. and treated with 88 parts of aluminum chloride (cf. Fieser and Campbell, J. Am. Chem. Soc., vol. 60, page 2635, 1938). Stirring is continued until all of the material has entered into solution and the mixture is permitted to stand for 36 hours at 0° C., poured on ice and 240 parts of concentrated hydrochloric acid and steam distilled. The residue is taken up in ether and the ether solution washed with aqueous potassium bicarbonate, dried over calcium sulfate and decolorized with charcoal. Upon evaporation a mixture of the 5-, 6-, and 8-acetyl derivatives of the methyl ester of dehydroabietic acid is obtained with the 6-isomer predominating and the 5-isomer being present in the smallest quantity.

*Example 2*

A solution of 100 parts of the mixture of the isomers obtained in the preceding example in 730 parts of absolute ether is treated with a trace amount of aluminum chloride and then in the course of 15 minutes with 46 parts of bromine with constant shaking. The mixture is treated with 2000 parts of water and the ether removed in vacuum. A slightly gummy precipitate is formed which is collected on a filter, washed with water, and recrystallized from ethanol. The yellowish crystals consist principally of the methyl ester of 6-bromoacetyldehydroabietic acid which has the structural formula shown below.

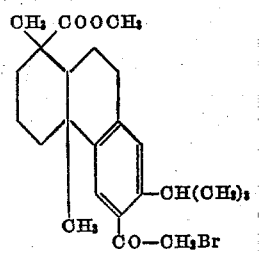

*Example 3*

To a stirred solution of 200 parts of the methyl ester of dehydroabietic acid, 720 parts of nitrobenzene and 50 parts of acetyl chloride, maintained at about 0–5° C., 170 parts of aluminum chloride is added. The reaction mixture is maintained under refrigeration at about 5° C. for 40 hours, after which it is poured onto ice. The aqueous layer is tested with indicator paper to make certain that it is distinctly acidic. For convenience in manipulating the organic phase, ether (about 700 parts) is added until the specific gravity of the organic layer is such that it rises above the aqueous layer. The organic phase is then washed with dilute sodium hydroxide solution and with several portions of water, dried over sodium sulfate and filtered. After removal of the ether by warming the filtrate on a steam bath, the residue, which contains nitrobenzene and resin acid derivatives, is fractionated by means of a vacuum distillation. A mixture of the acetyl derivatives of the methyl ester of dehydroabietic acid is obtained as a brown gum distilling at about 185–186° C. at 0.03 mm. When this crude product is crystallized from ether and then from methanol, there is obtained the purified methyl ester of 6-acetyldehydroabietic acid melting at 129–130° C. and having the following structural formula

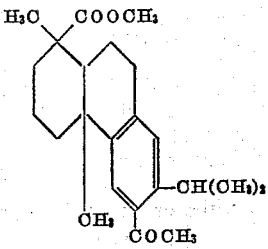

The 8-acetyl and 5-acetyl isomers are obtained by evaporating the crystallization liquors to dryness and subjecting the residue to chromatography on a silica gel column with increasingly polar mixtures of petroleum ether, benzene and ethyl acetate.

*Example 4*

To a solution of 71 parts of the methyl ester of 6-acetyldehydroabietic acid in 350 parts of ether there is added a trace of aluminum chloride and then, over a period of about 5 minutes, 32 parts of bromine. The mixture is stirred during the period of addition and for an additional 10 minutes, after which it is poured into 1000 parts of warm water at such a rate that the ether is vaporized about as rapidly as the reaction mixture is added. The crude product which separates as the ether vaporizes is collected, covered with 400 parts of ethanol and allowed to stand for several hours. The solid product is collected on a filter and washed with ethanol. The melting point is about 112–114° C. If a more highly purified product is desired, this material is recrystallized repeatedly from methanol and from mixtures of methanol and chloroform until the melting point is approximately 121–123° C. This compound, methyl 6-bromoacetyldehydroabietate, has the following structural formula

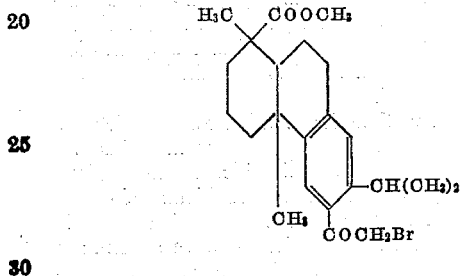

*Example 5*

A stirred mixture of 100 parts of the methyl ester of dehydroabietic acid, 64 parts of bromoacetyl bromide and 360 parts of nitrobenzene is maintained between about 0° and 3° C. while 85 parts of aluminum chloride is added in small portions over a period of 40 minutes. The reaction mixture is maintained at about 5° C. for 2 to 3 days and is then poured onto 500 parts of ice and 60 parts of concentrated hydrochloric acid. When the ice has melted, 700 parts of ether are added. The organic phase is washed with several portions of water, with 0.4% sodium hydroxide solution and again with several portions of water. The organic layer is then separated, dried over sodium sulfate, filtered and concentrated in vacuum until the ether and nitrobenzene are removed. The residual black gum is decolorized in ether solution with activated charcoal. Further purification of the methyl 6-bromoacetyldehydroabietate is achieved by repeated recrystallization from mixtures of methanol and chloroform.

*Example 6*

A solution of 356 parts of the methyl ester of 6-acetyldehydroabietic acid, 1600 parts of acetic acid, and 10 parts of concentrated hydrobromic acid is cooled to about 15° C. and treated by the addition of 160 parts of bromine in 800 parts of acetic acid. The colorless reaction mixture is then poured, with constant stirring, into 25,000 parts of ice water. The precipitated product is collected, digested with methanol and again collected on a filter. This material is a mixture of bromination products including methyl 6-bromoacetyldehydroabietate.

*Example 7*

A solution of 23 parts of bromine in 125 parts of dimethylformamide is mixed with a solution of 51 parts of the methyl ester of 6-acetyldehydroabietic acid in 175 parts of dimethylformamide, and the reaction mixture is stirred for 2 hours and then allowed to stand at room temperature for 2–3 days. The mixture is then diluted with 300 parts of water, with constant stirring, and the crystalline precipitate is then collected on a filter and washed with water. When this crude product is digested with methanol and then recrystallized several times from mixtures of chloroform and methanol, there is obtained purified methyl 6-bromoacetyldehydroabietate melting at 120–122° C.

The same methyl 6-bromoacetyldehydroabietate is obtained by the bromination of methyl 6-acetyldehydroabietate in ether solution, in acetic acid solution, and in dimethylformamide solution, and by the reaction of methyl dehydroabietate with bromoacetyl bromide and aluminum chloride. However, the percentages of other bromination products which are obtained vary in each of these procedures.

*Example 8*

A solution of 200 parts of the methyl ester of dehydroabietic acid, 720 parts of nitrobenzene and 79.5 parts of chloroacetyl chloride is cooled to about 0–5° C. and, with constant stirring, treated with a total of 170 parts of aluminum chloride added in small portions. The reaction mixture is maintained at about 5° C. for 48 hours and is then poured onto 1000 parts of ice. The aqueous layer is tested with indicator paper in order to make certain that the pH is no higher than 2. Ether (1400 parts) is added and the organic phase is washed with several portions of cold water, dried over anhydrous calcium sulfate and filtered. The ether and nitrobenzene are removed from the filtrate by distillation under reduced pressure, and the gummy residue is recrystallized several times from methanol to give purified methyl 6-chloroacetyldehydroabietate melting at 119–120° C. and having the following structural formula

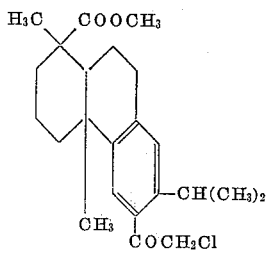

When the crystallization liquors are combined, decolorized with activated charcoal and concentrated, there is obtained the isomeric methyl 8-chloroacetyldehydroabietate. After recrystallization from methanol this compound melts at about 91–93° C. It has the following structural formula

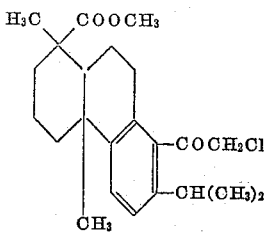

*Example 9*

A mixture of 13 parts of methyl 6-chloroacetyldehydroabietate, 60 parts of acetone and 13 parts of sodium iodide is shaken well and then allowed to stand for 20 hours at room temperature. The reaction mixture is then partitioned with the use of 320 parts of ether and an additional 250 parts of water. The ethereal layer is washed with 2 portions of 1% sodium thiosulfate solution and with several portions of water. It is then dried over anhydrous sodium sulfate, filtered and concentrated to about 10% of its original volume. When 160 parts of methanol are added a crystalline precipitate forms and is collected on a filter. Additional product is obtained by concentration of the filtrate. This compound is methyl 6-iodoacetyldehydroabietate. It melts at about 129–130° C. and has the following structural formula

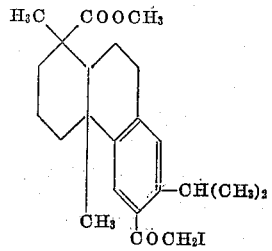

Mixtures of this compound with methyl 6-acetyldehydroabietate and with methyl-6-chloroacetyldehydroabietate exhibit pronounced depressions of the melting points.

The reaction between methyl 8-chloroacetyldehydroabietate and sodium iodide, conducted in the identical manner, gives methyl 8-iodoacetyldehydroabietate of the following structural formula

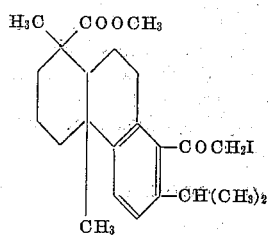

*Example 10*

Pyridine hydrochloride (150 parts) is placed in a round bottom flask and a distillation is carried out until about 30 parts of distillate is collected in the receiver. This forerun is discarded. Methyl 6-acetyldehydroabietate (10 parts) is added to the 120 parts of pyridine hydrochloride remaining in the distillation flask, and the mixture is refluxed for 30 minutes. The contents of the flask are then cooled and poured into 2000 parts of water, with constant stirring. The insoluble material which precipitates is collected and stirred with 1000 parts of 5% potassium hydroxide solution. The basic solution is filtered from an insoluble residue and the filtrate is stirred vigorously and acidified with a slight excess of dilute hydrochloric acid. The precipitated product is collected on a filter and washed well with water. This compound is 6-acetyldehydroabietic acid of the following structural formula

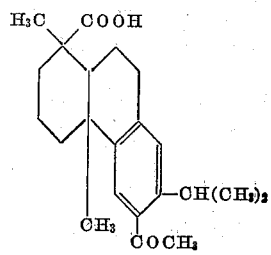

*Example 11*

To 12 parts of 6-acetyldehydroabietic acid (prepared by the method of Fieser and Campbell, J. Am. Chem. Soc., vol. 60, page 2635 (1938), or by the method of pyridine hydrochloride demethylation) in 55 parts of dimethylformamide there is added all at once a solution of 5.6 parts of bromine in 30 parts of dimethylformamide. The reaction mixture is stirred for 2 hours and then allowed to stand at room temperature for about 3 days. It is then diluted, with vigorous stirring, with 150 parts of water, and the precipitate which forms is collected and washed. By repeated recrystallization from ethyl alcohol, there is obtained purified 6-bromoacetyldehydroabietic acid of the following structural formula

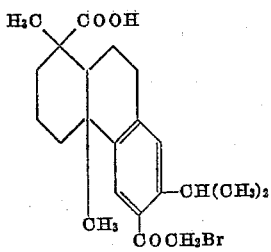

*Example 12*

Methyl 8-acetyldehydroabietate (19 parts), prepared by the method of Fieser and Campbell, J. Am. Chem. Soc., vol. 61, page 2528 (1939), is dissolved in 100 parts of dimethylformamide. There is then added a solution of 8.6 parts of bromine in 45 parts of dimethylformamide. This reaction mixture is stirred for 2 hours and then allowed to stand at room temperature for 4 days, at the end of which time it is poured, with stirring, into 200 parts of water. The precipitate which forms is collected on a filter and washed with water. After repeated recrystallizations from methanol there is obtained purified methyl 8-bromoacetyldehydroabietate having the following structural formula

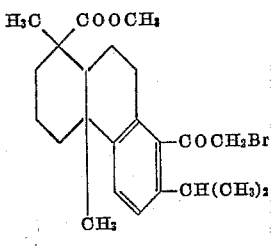

*Example 13*

A mixture of 10 parts of methyl 8-acetyldehydroabietate, 300 parts of ethyl alcohol and 20 parts of potassium hydroxide is heated under reflux for a period of 4 hours. Approximately half of the alcohol is then removed by distillation and the reaction mixture is poured, with stirring, into 1000 parts of water. The insoluble residue is removed by filtration and discarded. The filtrate is acidified with a slight excess of dilute hydrochloric acid, and the precipitated product is collected on a filter and washed with water. By recrystallization from mixtures of ethyl acetate and petroleum ether there is obtained 8-acetyldehydroabietic acid having the following structural formula

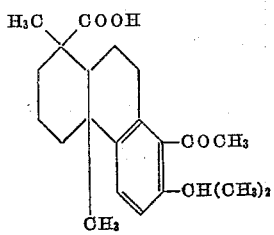

*Example 14*

Four parts of 8-acetyldehydroabietic acid dissolved in 20 parts of dimethylformamide is mixed well with a solution of 1.85 parts of bromine in 10 parts of dimethylformamide. After the reaction mixture has stood at room temperature for 4 days it is poured into 40 parts of water. The precipitated product is collected on a filter, washed with water and recrystallized from methanol and from mixtures of chloroform and methanol.

In this manner there is obtained 8-bromoacetyldehydroabietic acid having the following structural formula

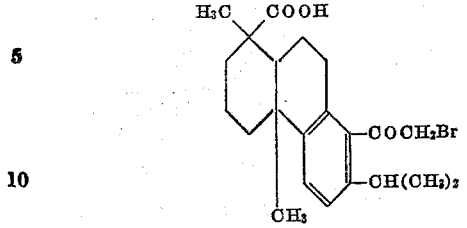

*Example 15*

A solution is prepared from 25 parts of the methyl ester of dehydroabietic acid, 90 parts of nitrobenzene and 7.4 parts of propionyl chloride and cooled to about 0–5° C. Aluminum chloride (21 parts) is added in several portions, and after the reaction mixture is refrigerated at about 5° C. for 40 hours it is poured onto ice. When the aqueous layer is tested with indicator paper the pH is less than 2. About 100 parts of ether is added and the organic phase is washed with dilute sodium hydroxide solution and with several portions of water. It is then dried over anhydrous sodium sulfate and concentrated under vacuum until the ether and nitrobenzene have been removed. When the residue is subjected to a vacuum distillation at about 0.05 mm. pressure, the mixture of the propionyl derivatives of methyl dehydroabietate is collected as a very viscous oil. The principal component of this distillate, methyl 6-propionyldehydroabietate, is obtained in purified form by crystallization from ether or from methanol. This compound has the following structural formula

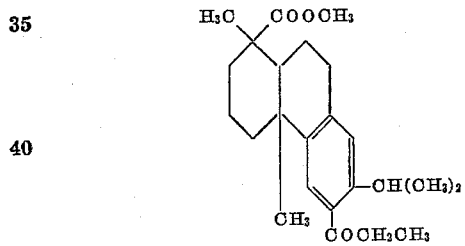

By subjecting the residues from the crystallization liquors to chromatography on a silica gel column, smaller quantities of the 8-propionyl and 5-propionyl isomers are obtained.

*Example 16*

A solution of 10.6 parts of methyl 6-propionyldehydroabietate in 35 parts of dimethylformamide is stirred for 2 hours with a solution of 4.6 parts of bromine in 25 parts of dimethylformamide and the mixture is then allowed to stand at room temperature for 4 days. The product is precipitated by gradual dilution with 80 parts of water and is then collected on a filter and washed. By recrystallization of this crude product from methanol, there is obtained purified methyl 6-(α-bromopropionyl)-dehydroabietate having the following structural formula

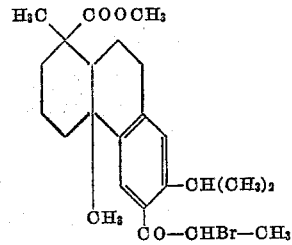

*Example 17*

A mixture of 1.0 part of methyl 6-propionyldehydroabietate, 30 parts of ethyl alcohol and 2 parts of potassium hydroxide is heated under reflux for about 4 hours and then concentrated by distillation to about half of its initial volume. The reaction mixture is then diluted with 100 parts of water and filtered from an insoluble residue. When the filtrate is acidified with a slight excess of dilute hydrochloric acid, 6-propionyldehydroabietic acid precipitates. This product is collected on a filter and washed with water. It has the following structural formula

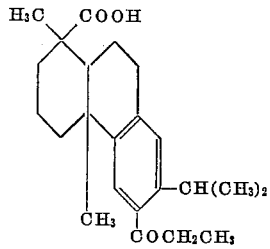

*Example 18*

A solution of 1.8 parts of bromine in 10 parts of dimethylformamide is mixed with a solution of 4 parts of 6-propionyldehydroabietic acid in 20 parts of dimethylformamide. The contents of the reaction flask are stirred for 2 hours and then allowed to stand at room temperature for 4 days. The mixture is then diluted with 50 parts of water and the product which precipitates is collected on a filter. By recrystallization from methanol or from mixtures of chloroform and methanol, there is obtained purified 6-($\alpha$-bromopropionyl)-dehydroabietic acid of the following structural formula

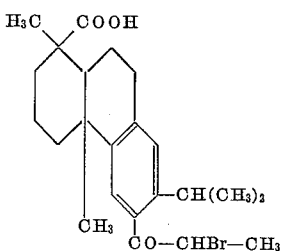

*Example 19*

A mixture of 40 parts of methyl O-methyl-7-acetylpodocarpate with 285 parts of absolute ether and a trace amount of aluminum chloride is treated over a period of 15 minutes by the dropwise addition of 18 parts of bromine. Constant shaking is employed to insure a smooth reaction. The mixture is then diluted with 1000 parts of water, and the ether is evaporated by gentle warming. The slightly gummy, crystalline product is collected on a filter, washed with water, and recrystallized from ethanol. The bromoketone is obtained in the form of almost white, large dense rods which melt at about 152–154° C. and give a strong Beilstein halogen test. A mixture with methyl 7-acetylpodocarpate, of melting point 151–152° C., melts at about 115–125° C. The methyl O-methyl-7-bromoacetylpodocarpate has the structural formula

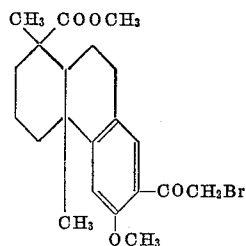

*Example 20*

A solution of 200 parts of methyl O-methyl-7-acetylpodocarpate, 850 parts of glacial acetic acid, and 890 parts of 48% hydrobromic acid is heated under reflux for a period of from one to two hours. During the period of reflux, an insoluble oil separates from the solution. The mixture is cooled and poured, with stirring, into about 12,000 parts of water, and the product is collected on a filter and washed thoroughly with aqueous potassium bicarbonate and water. By three recrystallizations from ethanol there is obtained the almost white, crystalline methyl 7-acetylpodocarpate which melts at about 151–152° C. Although this compound has a free phenol group, it is almost insoluble in dilute sodium hydroxide. It has the structural formula

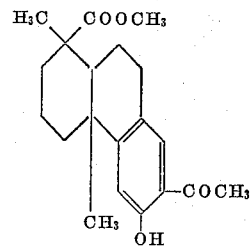

Treatment of this compound with bromine by the method of Example 19 yields the bromoketone, methyl 7-bromoacetylpodocarpate, having the structural formula

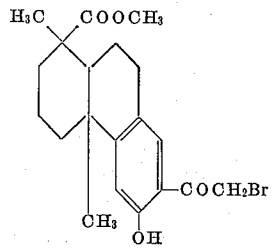

*Example 21*

A mixture of 32 parts of potassium hydroxide, 40 parts of water, 250 parts of diethylene glycol and 39 parts of methyl O-methyl-7-acetylpodocarpate is heated under reflux for a period of 5 hours. The reaction mixture is diluted to several times its volume with water and the insoluble material is removed by filtration or by extraction with a suitable solvent. In practice the rate of filtration is sometimes found to be extremely slow and in such instances satisfactory removal of the base-insoluble impurities can be achieved by extraction with ether, with the aid of sodium chloride to break up the emulsions which form. The clear aqueous solution is acidified with an excess of dilute hydrochloric acid and the precipitated crystalline product is collected on a filter. By sublimation of the crystals there is obtained purified O-methyl-7-acetylpodocarpic acid melting at 198–202.5° C. Treatment of this compound with bromine by the method of Example 19 yields O-methyl-7-bromoacetylpodocarpic acid having the structural formula

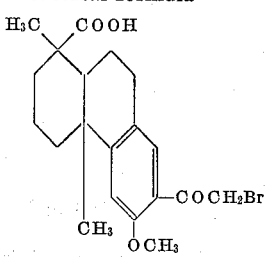

*Example 22*

Pyridine hydrochloride (250 parts) is placed in a round bottom flask and a distillation is carried out until the vapor temperature reaches about 215° C. The forerun which is collected in this manner is discarded, and 20 parts of methyl O-methyl-7-acetylpodocarpate is added to the pyridine hydrochloride remaining in the distillation flask. This mixture is heated under partial reflux for 1 hour in such a manner that excess pyridine is allowed to escape from the reaction vessel. The mixture is then cooled and diluted to several times its volume with water. The precipitated product is collected on a filter and washed with a small quantity of dilute hydrochloric acid and then with copious amounts of water. When this reddish-brown solid is purified by sublimation and by recrystallization from aqueous methanol, there are obtained well-formed crystals of 7-acetylpodocarpic acid melting at 213.5–216° C. Treatment of this compound with bromine by the method of Example 19 yields 7-bromoacetylpodocarpic acid having the following structural formula

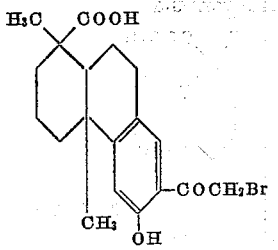

I claim:
1. A compound having the structural formula

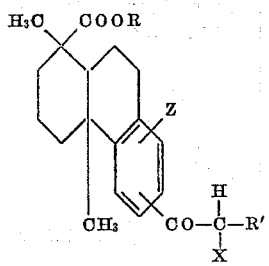

wherein R and R' are members of the group consisting of hydrogen and lower alkyl radicals, Z is a member of the group consisting of 6-hydroxy, 6-(lower)alkoxy and 7-isopropyl radicals, and X is a halogen atom.

2. A compound having the structural formula

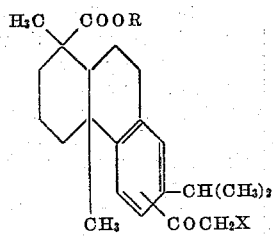

wherein R is a lower alkyl radical and X is a halogen atom.

3. A compound having the structural formula

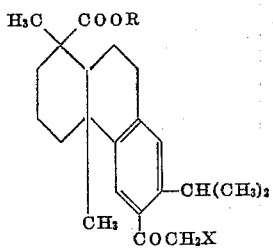

wherein R is a lower alkyl radical and X is a halogen atom.

4. A compound having the structural formula

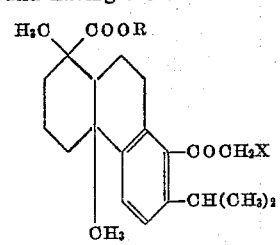

wherein R is a lower alkyl radical and X is a halogen atom.

5. A compound having the structural formula

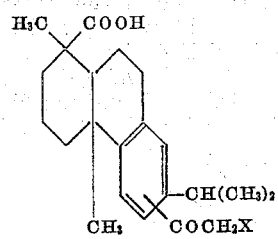

wherein X is a halogen atom.

6. A compound having the structural formula

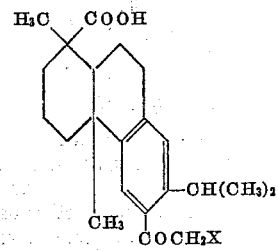

wherein X is a halogen atom.

7. A compound having the structural formula

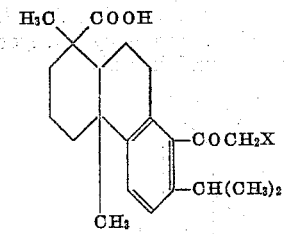

whearein X is a halogen atom.

8. Methyl 6-haloacetyldehydroabietate.
9. Methyl 8-haloacetyldehydroabietate.
10. 6-bromoacetyldehydroabietic acid.
11. 8-bromoacetyldehydroabietic acid.
12. A compound having the structural formula

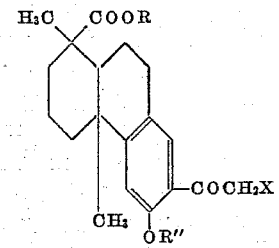

wherein R and R'' are members of the group consisting of hydrogen and lower alkyl radicals and X is a halogen atom.

13. Methyl O-methyl-7-haloacetylpodocarpate.
14. Methyl O-methyl-7-bromoacetylpodocarpate.
15. The process for preparing a compound having the structural formula

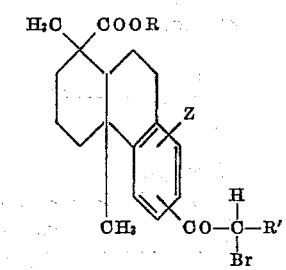

wherein R and R' are members of the group consisting of hydrogen and lower alkyl radicals and Z is a member of the group consisting of 6-hydroxy, 6-(lower)alkoxy and 7-isopropyl radicals, which comprises mixing a solution of a compound having the structural formula

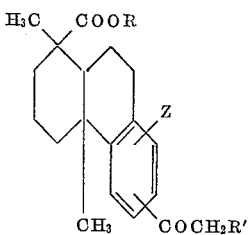

wherein R, R' and Z are defined as hereinbefore, in an inert organic solvent, with bromine.

References Cited in the file of this patent

UNITED STATES PATENTS

| | | |
|---|---|---|
| 2,050,979 | Borglin | Aug. 11, 1936 |
| 2,359,826 | Campbell | Oct. 10, 1944 |
| 2,390,736 | Price et al. | Dec. 11, 1945 |
| 2,656,345 | Jacobson | Oct. 20, 1953 |

OTHER REFERENCES

Elsevier's "Encyclopaedia of Org. Chem.," vol. 13, p. 960.

The Chem. of Org. Compounds, Conant and Blatt, 3rd ed., p. 420, The MacMillan Co., New York, 1947.

"Anhydrous Aluminum Chloride in Org. Chem.," C. A. Thomas, A. G. S. Monograph Series No. 87, Reinhold Pub. Corp., New York (1941), pp. 610 and 773–74.